United States Patent [19]

Carey

[11] Patent Number: 5,210,898
[45] Date of Patent: May 18, 1993

US005210898A

[54] WOODEN BROOM ASSEMBLY AND ADAPTER MEANS THEREFOR

[75] Inventor: Thomas J. Carey, Urbana, Ohio

[73] Assignee: Vining Industries, Inc., Springfield, Ohio

[21] Appl. No.: 743,722

[22] Filed: Aug. 12, 1991

Related U.S. Application Data

[63] Continuation of Ser. No. 392,437, Aug. 11, 1989, abandoned.

[51] Int. Cl.⁵ ............................................. F16B 9/00
[52] U.S. Cl. .................................. 15/176.2; 15/145; 403/277; 403/263; 403/361
[58] Field of Search .................... 15/172, 176.3, 176.2, 15/176.5, 176.1, 145; 403/287, 343, 194, 263, 360, 299, 296, 298, 361

[56] References Cited

U.S. PATENT DOCUMENTS

| 3,524,210 | 8/1970 | McLean | 403/343 |
| 4,373,828 | 2/1983 | Sartori | 403/263 |
| 4,394,097 | 7/1983 | Horlacher | 403/263 |
| 4,433,931 | 2/1984 | Malish et al. | 403/194 |
| 4,684,283 | 8/1987 | Lewis | 403/287 |
| 4,722,634 | 2/1988 | Malish | 403/299 |
| 4,792,256 | 12/1988 | Batchelor | 403/299 |

FOREIGN PATENT DOCUMENTS

| 579564 | 6/1933 | Fed. Rep. of Germany | 403/299 |
| 1166146 | 3/1964 | Fed. Rep. of Germany | 15/145 |
| 1465899 | 12/1966 | France | 15/145 |

Primary Examiner—Philip R. Coe
Assistant Examiner—Patrick F. Brinson
Attorney, Agent, or Firm—R. William Graham; H. Stanley Muir

[57] ABSTRACT

A broom assembly of a basically wooden push broom comprises a wooden head portion including top and bottom surfaces, leading and trailing edge portions and remote lateral extremities, considering the direction of its movement in use. This head has a laterally centered throughbore opening at one end from the tope thereof adjacent its trailing edge and at its opposite end from the bottom thereof, adjacent its leading edge. A counterbore of the upper end of this throughbore produces an outwardly and rearwardly facing annular shoulder in its bounding wall surface. Securely wedged within this throughbore, towards its bottom, is the short tubular body portion of a rigid plastic adapter means, an external flange at the base end of which overlies the bottom of the head and an external lip at the upper end of which clamps over the aforementioned shoulder in the wall bounding the upper end of the throughbore. The adapter means is thereby clamped to and contains within the axial limits thereof an integral part of the head. In the lodging thereof within the throughbore, differentially formed portions of the external surface of the tubular body portion of the adapter means differentially wedge in its bounding wall surface, effectively precluding its relative rotative displacement. A small portion of the inner surface of the adapter means has a short truncated thread the form of which enables an easy and most secure connection thereto of a complementarily formed portion of an applied handle.

13 Claims, 2 Drawing Sheets

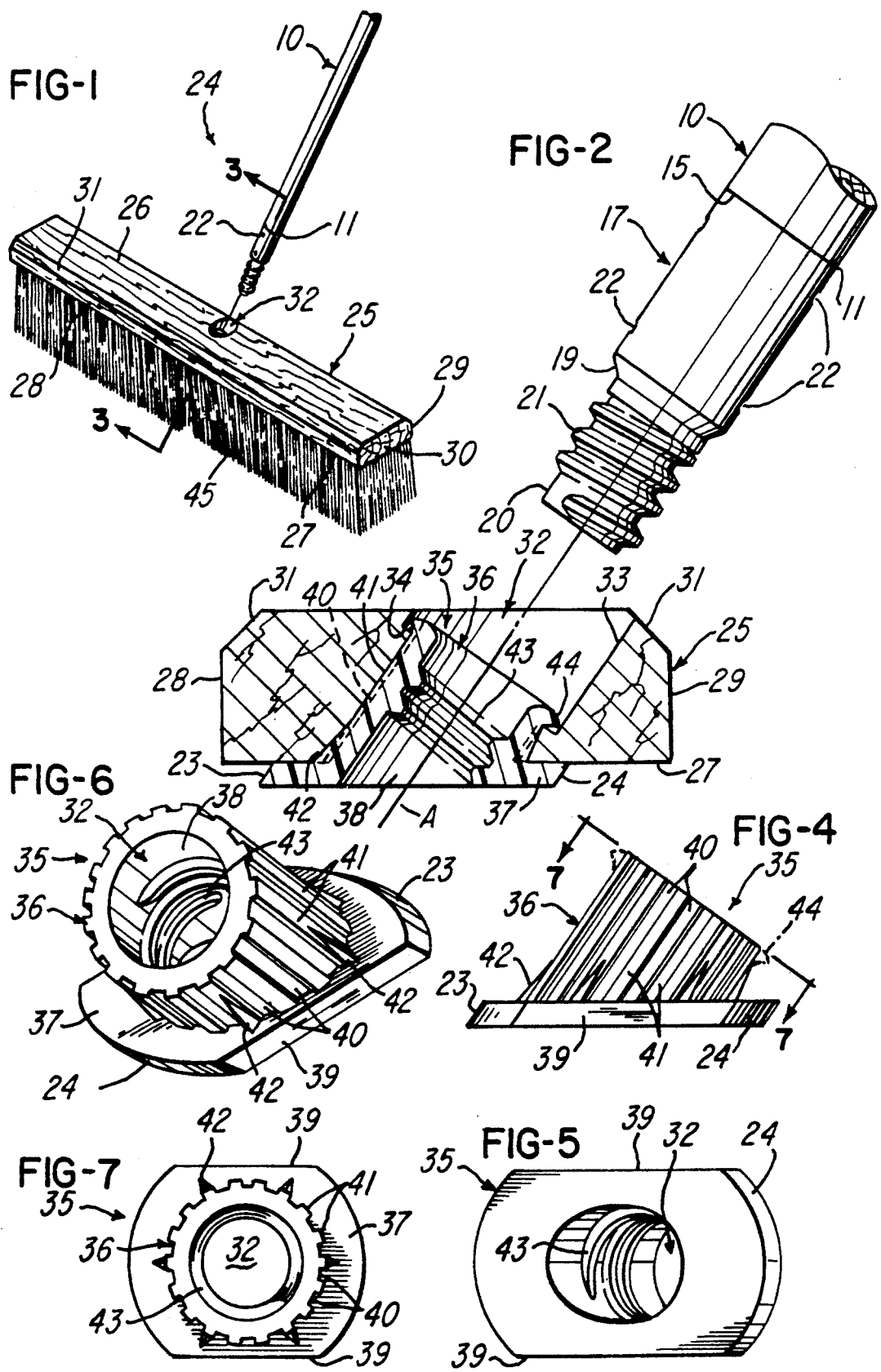

U.S. Patent    May 18, 1993    Sheet 2 of 2    5,210,898
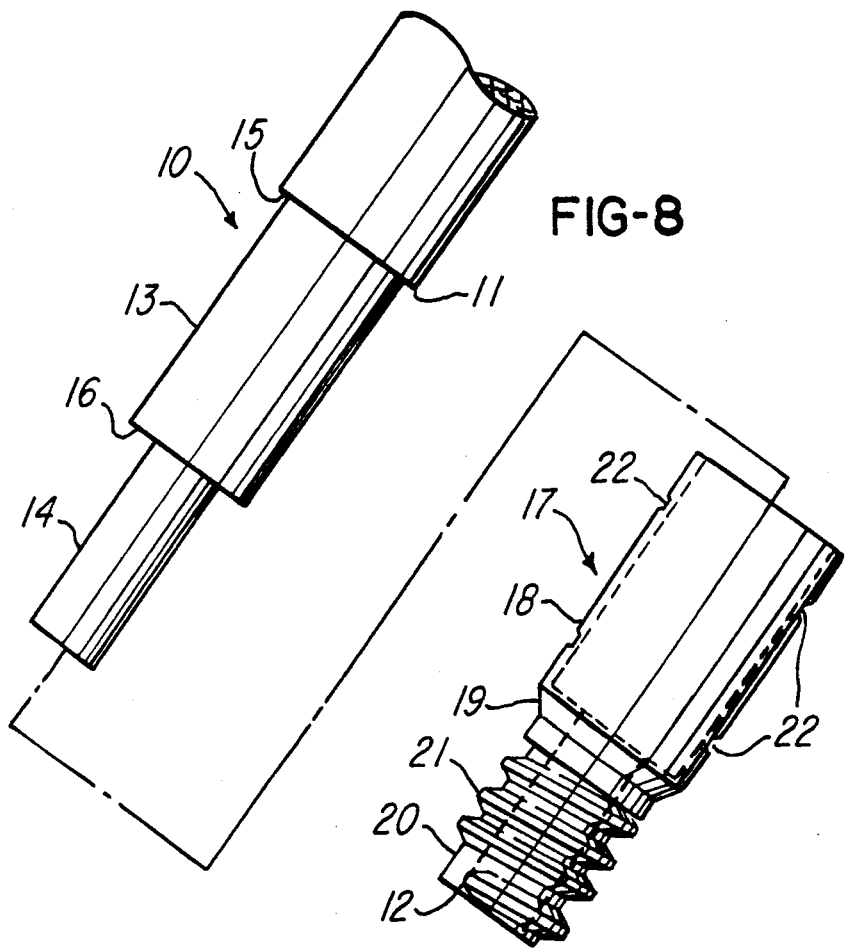
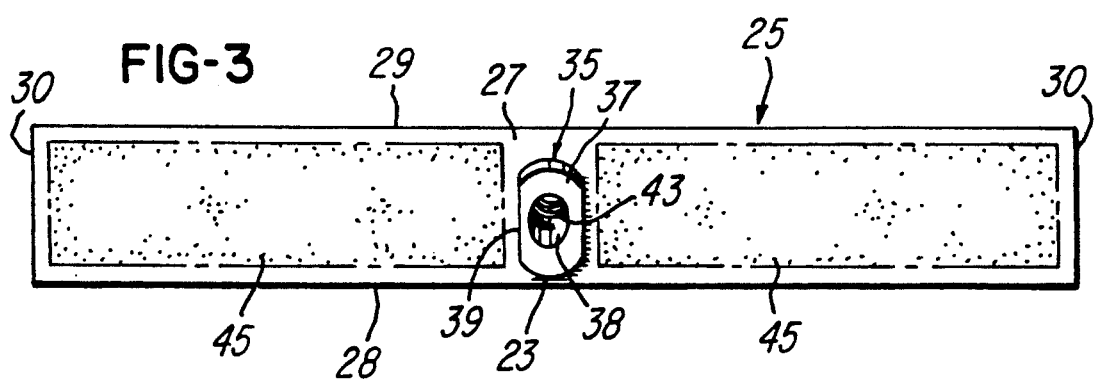

WOODEN BROOM ASSEMBLY AND ADAPTER MEANS THEREFOR

This is a continuation of parent application U.S. Ser. No. 07/392,437, filed Aug. 11, 1989 now abandoned.

BACKGROUND OF THE INVENTION

This invention relates to apparatus providing a new and improved construction and method of fabrication of cleaning and applicator devices comprising a head and handle which are basically formed of wood or a like material having similar properties.

It is highly advantageous in application to broom assemblies, in particular push brooms and will therefore be herein illustrated and described in this context, by way of example but not by way of limitation. Such embodiments of the invention feature simplistic adapter means which, by means of their format and mode of interrelation with the respective parts of these devices, (1) render such devices more economical to fabricate and more durable and satisfactory in use; (2) insure ease in their fabrication, assembly, disassembly and use; (3) overcome adverse aspects which have been frequently found to be inherent in use of wood for broom heads; (4) insure a more secure interconnection of their parts and (5) provide them with a considerably longer effective operating life.

By reason of the foregoing not only does this invention relate to highly beneficial developments and improvements in devices such as broom assemblies and push brooms basically made of wood but it also solves and virtually eliminates the heretofore continuing difficulties which manufacturers have encountered in their efforts to achieve a stable inexpensive means for and an effective method of interconnecting a broomstick, handle or the like to a wooden operating head of the device of which it forms a part. This should become quite clear from the following detailed disclosure of an illustrative embodiment which demonstrates the features of the present invention.

SUMMARY OF THE INVENTION

Embodiments of the present invention provide devices particularly advantageous for surface cleaning and maintenance comprising a head portion formed of wood, or other material having like properties, which includes therein a bore to accommodate the application thereto of means for manipulation thereof. Applied within said bore, at least in part, and connected to said head, is a unitized adapter means which as distinguished from wood is made of a high strength, relatively rigid, impermeable material, preferably plastic. This adapter means is so formed and applied to said head to effect a connection therebetween which precludes axial and rotative movement of one thereof relative the other during their use and to lend ease and security in the coupling thereto of said means for manipulation of said head. In their preferred format said adapter means includes a short tubular body portion at least a major portion of the length of which is lodged within said bore, within a limited area of its axial extent. Said tubular body portion is further distinguished by a plurality of differentially shaped and positioned connector means which commonly engage said head to mutually effect a connection between said adapter means and said head which precludes axial and rotative movement of one thereof relative the other.

Preferred forms of these embodiments feature adapter means highly advantageous for application to a throughbore in a wooden operating head of a push broom or other cleaning or applicator device to insure an effective and secure connection thereto of a wooden handle, broomstick or the like device for the manipulation thereof wherein the adapter means comprises a relatively short tubular body portion, the axial extent of which is less than that of the inner wall surface of the bore to which it applies and the base end of which includes an external flange which limits against the bottom of the head to which it applies while means at its opposite end is engaged to the related head to function with said flange to anchor said adapter means to said head to positively preclude axial displacement of said adapter means with respect to said head in the use of the device of which they form a part. The inner wall surface of said body portion includes means for the secure connection thereto, within a limited extent of the length of thereof, of a portion of the length of a broomstick or broom handle applied in said throughbore. In this embodiment of the invention the upper end of this tubular portion is generally annular in configuration and lies in a plane perpendicular to its longitudinal axis while the base end thereof bounds an elliptical opening which lies in a plane oblique to said axis.

In a preferred form of the just described embodiment the base end of said tubular portion has an external flange, the tubular portion of said adapter means is formed for a press fit engagement thereof in one end of a throughbore in a broom head limited by said flange and the axial length of said tubular portion is limited so that it is shorter than that of the bore in the head of the broom to which it is applied. In most preferred forms of the aforementioned embodiments of said adapter means said tubular portion thereof includes means at each of its opposite ends which are applied to the body of the broom head into which said tubular portion is inserted to effectively preclude axial movement and relative rotation as between said tubular portion and said head.

Desirable embodiments of said adapter means are rigid structures comprising a body portion having a short generally tubular configuration the axial length of which is less than that of the bore in the head to which it applies and featuring interconnected parts so arranged on the installation of said body portion in said head to apply to axially spaced surface portions of said head to clamp a portion of said head therebetween to thereby preclude axial displacement of one of said head and body portion relative the other in use of the device of which they form a part.

In most desirable embodiments said tubular body portion has an integrally formed flange at one end thereof which serves as one of said interconnected parts of said body portion between which said portion of said head is clamped and the outer surface of said body portion embodies spaced means which are anchored in bounding portions of the head to which it applies to effectively preclude the occurrence of relative rotative movement therebetween in application and use of the device in which said adapter means is embodied. A form of flange which has been found to be particularly desirable is one which has an oblong configuration and is positioned in immediately underlying relation to the bottom of a head portion of a device per the invention.

Further advantages of considerable benefit are provided by said adapter means of the invention in that their integral structure includes a plurality of differentially formed means which respectively lodge in, apply and connect to and contain portions of the head to which it applies, effecting thereby a secure relation of these parts during use of the device of which they form a part.

In another perspective thereof the present invention provides an embodiment of the aforementioned adapter means comprising a relatively short tubular body portion including a flange at one end thereof having an oblong configuration, the longitudinally extended sides of which are parallel, and generally central to said flange is a generally elliptical opening defining one end of the bore of said tubular body portion the opposite end of which is formed on a uniform radius. The tubular body portion is further distinguished in this instance by a longitudinal axis which is inclined to the plane of said flange and ends thereof which are in non-parallel planes.

A further particularly advantageous adapter means comprises a short tubular body portion the outer surface of which is distinguished by parallel spaced channels adjacent of which define therebetween bar-like projections a portion of which include blade-like projections from their outer surface.

An additional preferred embodiment of the invention provides an assembly particularly advantageous for use in the fabrication of a basically wooden push broom. In this instance it comprises a wooden head portion including top and bottom surfaces, leading and trailing edge portions, remote lateral extremities and a laterally centered throughbore opening at one end from the top of the head adjacent its trailing edge and at its opposite end from the bottom of the head, adjacent its leading edge. Accordingly, the central axis of this throughbore is inclined in the direction of its trailing edge. A counterbore of the upper end of the throughbore produces an outwardly and rearwardly facing annular shoulder in its bounding wall surface. Wedged within this throughbore is the short tubular body portion of a rigid plastic adapter means an external flange at the base end of which overlies the bottom of the head and an external lip at the upper end of which clamps over the shoulder in the wall bounding the upper end of the throughbore. The adapter means thereby clamps to and contains within the axial limits thereof a significant portion of the body of the head block. In its press fit application in the throughbore, a differentially formed portions of the external surface of the tubular body portion of the adapter means differentially wedge in its bounding wall to preclude their relative rotative displacement. A small portion of the inner surface of the adapter means has a short truncated thread to which a complementary formed applied end of a wooden handle easily and securely connects to complete the push broom.

In particularly preferred broom embodiments of the present invention the adapter means applied to a broom head is a stable structure of plastic material and the broom stick applied thereto, in accordance with the present invention, is provided at the applied end thereof with a sleeve of strong, rigid material the projected extremity of which corresponds to the applied extremity of the broom stick and an end portion of said sleeve including said applied extremity has an external thread which is formed to securely engage with a very short thread projected radially inward of the interior wall which bounds the bore defined by said tubular portion of said adapter means.

A primary object of the invention is to provide improvements in manually operable cleaning and maintenance devices which basically comprises a wooden operating head and handle or broomstick for the manipulation thereof rendering them economical to fabricate, more rugged, efficient and satisfactory in use, unlikely to malfunction and endowing them with a longer and more effective operating life.

Another object is to provide a new and improved construction for and method of fabrication of adapter means for effecting a repeatable secure connection between components of devices which are formed of wood or other material having similar properties, particularly those comprising a head and a relatively long handle.

A further object is to provide a stable inexpensive means for effecting a repeatable secure connection between components of devices which are formed of wood or other material having similar properties, particularly those which comprise a head and a releasable connectable handle and are applied to surface maintenance procedures.

Another object is to provide adapter means for use in the connection of component parts of wooden push brooms and the like which insure the production of such devices in a more positively structured form.

An additional object is to provide adapter means particularly advantageous in application to devices for use in surface cleaning and maintenance procedures which overcome adverse aspects frequently found to be inherent in use of wood for the essential component parts thereof.

A further object is to provide adapter means for use in connecting component parts of brooms and like objects, particularly push brooms which are basically structured of wood, to render such devices, in their composite, significantly stronger and more durable and effective and virtually maintenance free in use.

Another object of the invention is to provide a significantly improved basically wooden push broom and similar surface cleaning and maintenance devices possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein are shown some but not the only forms of embodiment of the present invention, FIG. 1 is a partially exploded perspective view of a push broom constituting a preferred embodiment of the present invention wherein the extent of the showing of the broomstick or broom handle portion thereof is limited to its lower end;

FIG. 2 is an exploded enlarged view of the push broom of FIG. 1 shown in vertical side elevation and partly in section, bristles being removed from the head of the broom assembly portion thereof for clarity of disclosure;

FIG. 3 is a bottom view of the broom assembly portion of the push broom shown in FIG. 1, wherein the bristles thereof are only schematically illustrated to insure clarity of detail;

FIG. 4 is a side elevation view of a plastic adapter means per the present invention which, as seen in FIGS. 2 and 3, is press fit in an inclined bore formed within and in a laterally centered relation to the body of a rectangular wooden block which defines the head of the broom assembly shown in FIG. 1;

FIG. 5 is a bottom view of the adapter means shown in FIG. 4;

FIG. 6 is a perspective of the adapter means of FIGS. 2, 4 and 5 here shown in an end to end reversed orientation and as seen from the top, one side and what constitutes the trailing portion thereof as applied in use;

FIG. 7 is a view taken on line 7—7 of FIG. 4;

FIG. 8 is an enlarged exploded perspective view of the lower end portion of broomstick or handle of FIGS. 1 and 2 illustrating further adapter means in connection therewith for a precision secure coupling thereof to the adapter means integrated with and forming part of the head of the push broom of FIG. 1.

Like parts are designated by similar characters of reference throughout the several views.

The illustrated embodiment of the present invention shown in the accompanying drawings comprises a relatively small diameter, solid, cylindrically configured wooden handle 10 which is substantially uniform in diameter from its dome shaped end which is outermost in use to a point 11 adjacent but spaced from its opposite end 12. The remaining relatively short portion of the length of handle 10 between the point 11 and its opposite end 12 is composed of two following sections 13 and 14. Sections 13 and 14 are successively reduced in both length and diameter to define on the outer surface of handle 10 two annular radial shoulders 15 and 16 which are longitudinally spaced, parallel and face in the direction of end 12. Point 11 coincides with the location of shoulder 15. The peripheral surfaces of sections 13 and 14 have diameters which in their composite render their configuration complementary to the interior of a coaxially applied, coextensive, circumferentially encompassing, tightly and securely fixed tubular sleeve 17.

Sleeve 17, which is formed of a rigid high strength material, in this instance metal, exhibits that its length is comprised of three successive definitive sections 18, 19 and 20. Section 18 has a uniform outer diameter and wall thickness the dimensions of which correspond respectively to that of the circumferential outer limit and the radial extent of shoulder 15. The outermost surface portion of section 20 is defined by the outer truncated peripheral limit of a screw thread 21 that extends substantially the length thereof and has an outer diameter the dimension of which is smaller than that of section 18. The diameter of the root portion of the thread, as will be obvious, is substantially uniform and even smaller. Note that in this preferred illustrated embodiment of the invention the radially outermost limit of the thread 21 being truncated is thereby rendered relatively broad in a direction axially of the sleeve.

Section 19 defines a short transition section at the commencement of section 20, the outer surface of which is conically convergent in the direction of end 12. The base, largest diameter end, of section 17 merges with the adjacent end of section 18 which has the same diameter. The truncated apex end of section 19 has a diameter which is virtually identical with that of the outermost limit of thread 21 and merges with the commencement of the spiral thereof.

In the embodiment illustrated the length of sleeve 127 is such that the end 12 of handle 10 is slightly recessed with reference to the adjacent end of sleeve 17.

Subsequent to the application of sleeve 17 to handle 10, its section 18 is struck at each of two locations along its length, respectively adjacent and equidistantly spaced from its opposite ends, to produce at each said location a pair of diametrically opposite portions 22 of its outer surface which are punched and offset radially inward sufficient to produce projections radially inward of its inner surface which lodge in and lock to the body of handle 10. The portions 22 and corresponding projections are so arranged as to dispose in longitudinally spaced aligned pairs. The net effect thereof is that sleeve 17 is so anchored to and integrated with handle 10 to preclude any relative adverse longitudinal or circumferential displacement thereof when applied to their intended use.

In the example illustrated handle 10 is applied to a push broom assembly 24 comprising a head block 25, made of wood, that has an oblong rectangular configuration which, with reference to its normal disposal when applied to its intended use, includes a top surface 26, a bottom surface 27 parallel to surface 26, a leading side surface 28, a trailing side surface 29 parallel to surface 28 and parallel end surfaces 30. The top surface 26 of head block 25 is peripherally rimmed by a uniform bevel 31.

Head block 25 is provided with a throughbore 32 which is laterally centered between its ends 30. The upper end of throughbore 32 opens through the trailing half of top surface 26 of block 25 and in part intersects the trailing portion of bevel 31 at the upper limit of its trailing side surface 29. At its lower limit throughbore 32 opens through a laterally centered portion of the bottom surface 27 of head 25 which is offset to be more closely adjacent the leading side surface 28 than the trailing side surface 29 of head 25. As will be seen from FIG. 2 of the drawings, bore 32 is so oriented that its central longitudinally extending axis inclines to the bottom surface of head 25, in the direction of its trailing edge, to form with respect thereto a substantially 55° angle of inclination. This angle is preferred for the convenience of the user of the push broom embodiments of the invention herein illustrated. Throughbore 32 is further distinguished by a counterbore 33 directed inwardly of its upper end which defines an annular shoulder 34 in its bounding wall surface that faces in a direction outwardly and rearwardly of top surface 26 of head block 25. The opening defined by the throughbore 32 at the upper end thereof has a uniform radius, whereas the opening defined by its lower end, in the bottom surface 27 of block 25, has a generally elliptical configuration. Note that the plane of shoulder 34, if extended in the direction of the trailing edge of block 25 to intersect its bottom surface 27, defines therewith an approximately 35° angle. As seen in FIG. 2, head block 25 also incorporates a relatively rigid, high strength, tubular adapter means 35, preferably formed of a plastic material, in part within and in a lining relation to a major portion of the longitudinal extent of that wall surface which bounds its throughbore 32.

More particularly adapter means 35 comprises a relatively short tubular body portion 36 which is pressed into throughbore 32 by way of its opening from the bottom surface 27 of head block 25. What may be considered the base end of tubular body portion 36 is provided with an external flange 37 having an oblong configuration central to which is an elliptical opening from the lower end of the bore defined by the interior surface 38 of tubular body portion 36. The oblong configuration of the outer periphery of flange 37 provides it with parallel longitudinally extending side surfaces 39 which in the setting of the tubular body of the adapter means 35 within the throughbore 32 are positioned parallel to end surfaces 30 of head block 25. The respective apex ends 23 and 24 of the oblong configuration of flange 37 are arcuately symmetrical and laterally centered with reference to and respectively located closely adjacent the leading edge of the bottom surface 27 and in a more widely spaced relation to its trailing edge.

Note should be made of the fact that the tubular body portion 36 and its central longitudinally extending axis are so oriented with reference to the plane of its base flange to incline over the flange in the direction of its trailing edge portion 24, to form with the trailing portion of the flange a substantially 55° angle of inclination. Accordingly the angularity of the inclination of body portion 36 to flange 37 corresponds generally with the angularity of throughbore 32 to the plane of the bottom surface 27 of head 25.

The exterior surface of tubular body portion 36 is provided with a plurality of grooves or channels 39 which extend the length thereof from its flange 37 and are arranged in a circumferentially, equidistantly, spaced parallel relation to define between successively adjacent thereof, in each case, a bar-like projection 40. With the 360° circular extent of the tubular body portion 36, six of the bars 40 which are equidistantly spaced and paired in diametrically opposite relation each have, on the length of a lower and radially outermost surface portion thereof, an integrally connected, radially projected, generally triangular pyramidal tapered spline 42. In each case spline 42 is generally triangular in transverse section, its upper limit merges with the outer surface of the bar 40 with which it is integrated, at a point centered between its sides, and its lower limit extends to and has the triangular base thereof merged into the upper surface of flange 37. Splines 42, so provided, produce tapered blade-like projections from each of the aforementioned six bars.

The inner surface 38 of tubular body portion 36 of adapter means 35 is itself distinguished by an integral radial projection therefrom, into that portion of bore 32 which it bounds, of a truncated thread 43 which is complementary to the thread 21 on section 20 of the sleeve 17 of the broomstick 10. In this case, however, thread 43 is very short in length and the helical extent thereof is about half the length of thread 21 and not appreciably more than about 750°.

As will be obvious, the outer diametral dimension and axial length of tubular body portion 36 of adapter means 35 are modestly oversize as compared to the diameter and axial extent of that portion of the wall surface 38 which peripherally bounds bore 32 between the bottom surface 27 and shoulder 34 of head 25.

Accordingly, to effect the assembly of adapter means 35 to head 25 it is required that the end of body portion 36 of adapter means 35 remote from its base flange 37 be aligned with and presented to the elliptical opening of bore 32 from the bottom surface of head 25 and that the body portion 36 be then forcefully pressed and driven inwardly of bore 32, in the process of which interference fit procedure not only are portions of bars 40 established in a pressured wedged interfit relation to their bounding wall structure but also at the same time the splines 42 which radially project outwardly therefrom are even more deeply lodged in and anchored to their bounding wall surface. In the process thereof flange 37 is positioned immediately of and to limit against bottom surface 27 of head 25. At this point the positioning of tubular body portion 36 is such that a short end portion of its length projects to a point shortly beyond the shoulder 34.

To complete the installation of adapter means 35, it is now subjected to a further procedure wherein a tool having a working surface conically convergent to its projected extremity, like surface portion 19 of sleeve 17, is applied, under pressure, to and within that end portion 44 of body portion 36 which projects beyond the shoulder 34 and caused to rotate as it is driven inwardly thereof to cause this projected end portion of the tubular body portion 36 to flare out and bend back to define a lip 44 on body portion 36 which is thereby forced into an overlapping relation to shoulder 34 while at the same time flange 37, as a result thereof, is drawn tightly to bottom surface 27 of head 25. The consequence of this procedure is to effectively and firmly clamp a significant portion of block 25 between flange 37 and lip 44 and thereby fixedly connect the adapter means to block 25 in a manner to preclude relative rotational or axial displacement therebetween. Contributing significantly to this effect is the form and disposition of flange 37, the compound and differential character of the retention means of the adapter structure and the imposed interrelation of its parts, particularly in the format illustrated. Once this is achieved, a broom assembly per the present invention can quickly and easily have applied thereto the sleeved (17) lower end portion of the broomstick which has been heretofore described in detail. It has been found to be inherent under such circumstances that in a simple and very easy screwing of the truncated thread 21 of sleeve 17 to the very short complementary thread 43 on the inner surface of adapter 36, utilizing little more than one or two turns, and the pressured rotative abutment to the flared over end portion 44 of the conically convergent surface portion 19 of sleeve 17 that one effects a most secure fixed relation of the broomstick 10 to the broom assembly which is lasting and repeatable and most durably provided to an extent that it considerably increases the effectiveness and efficiency of the resultant product. At the same time embodiments of the invention will in the extended use thereof be found to display the achievement of all the aforementioned benefits and objectives of the present invention.

It has been also confirmed that the adapter means of the invention will achieve benefits and objectives such as previously enumerated whether applied to soft or hardwood components of the devices in which the features thereof are embodied.

In addition the means and mode of the format and interrelation of features of the present invention as combined with component parts of cleaning and maintenance equipment basically formed of wood will in any case contribute significant benefits to both manufactures and users of such devices.

From the above description it will be apparent that there is thus provided a device of the character described possessing the particular features of advantage before enumerated as desirable, which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims which are included in this specification by reference.

What is claimed is:

1. Apparatus useful for surface clean up, maintenance and other applications requiring the connection thereto of a handle for the manipulation thereof comprising:

an operating head formed of wood or other material having like properties mounting means for application to clean up, maintenance and similar procedures, said operating head having top and bottom surface portions respectively intercepted by the respective opposite ends of a throughbore said throughbore having a longitudinal axis which is inclined with respect to said surface portions and an upper portion of said throughbore is a counter bore of a slightly greater diameter than the remainder of said throughbore to thereby create a shoulder;

adapter means including a short tubular body portion which is press fit within and to a portion of the axial length of said throughbore, said adapter is inserted into said operating head from its said bottom surface portion, said tubular body portion of said adapter means having a plurality of circularly spaced bars on its outer surface which are compressible and which create a pressured bearing relation to and lodge against those portions of a wall of said throughbore which are in bounding relation thereto;

said tubular portion having a first end which is capable of deformation and is inserted into said throughbore and which, when inserted into said throughbore, deforms to create a lip which draws down against said throughbore shoulder to prevent said adapter from translating away from said top portion of said operating head;

said tubular portion further having at its other end a flange extending about the circumference of said tubular body portion and angled at the same angle to said tubular body portion as said throughbore is to said operating head to prevent said tubular portion from further translating toward said top portion of said operating head, and which is drawn against said bottom portion by the creation of said lip in tight abutment to reinforce said operating head bottom portion;

said spaced bars, lip, and shoulder interacting to preclude axial and rotative movement of said adapter means relative to said operating head;

and the inner surface of said tubular body portion having means integral therewith for a quick and secure insertion therein and threaded attachment thereto including the upper surface of said lip which acts as a seat for one end of a handle to be used for the manipulation of said apparatus during the application thereof to its intended use.

2. A device as in claim 1, wherein the exterior surface of said tubular body portion of said adapter means includes a plurality of integral differentially formed means including splines which are outwardly projected and tapered such that when said body portion is forcefully pressed and driven inwardly of said throughbore, said splines are even more deeply lodged in and anchored to the abutting wall portions of said throughbore to prevent axial rotation with respect thereto.

3. Apparatus as in claim 1, wherein the ends of said tubular body portion are in non-parallel planes and that plane of the end of said tubular body portion most adjacent said top surface portion of said operating head is perpendicular to the centerline of said tubular body portion.

4. Apparatus as in claim 1, wherein said flange extends radially outwardly from said tubular body portion uniformly about its circumference such that it is in abutting contact with said bottom portion of said operating head about the perimeter of said throughbore and radially outwardly for some distance therefrom to reinforce said bottom portion and seat said tubular body portion against said bottom portion firmly with respect thereto.

5. Apparatus as claim 1, wherein the external surface of said tubular body portion of said adapter means is distinguished by relatively projected means formed and positioned to differentially engage to the portions of said operating head by which they are bounded.

6. Apparatus as in claim 5, wherein said relatively projected means are in the form of said longitudinally extended bars which are capable of compression, outwardly projected tapered splines which do not compress, and said lip which deforms outwardly and downwardly in an overlapping relation with said throughbore shoulder to draw said flange tightly to said bottom surface to thereby fixedly connect said bars against and to penetratingly connect said splines in said throughbore wall.

7. Apparatus useful for surface clean up, maintenance and other applications requiring the connection thereto of a handle for the manipulation thereof comprising an operating head portion formed of wood or other material having like properties mounting means for application to surfaces requiring clean up and/or maintenance procedures, said head portion having top and bottom surface portions respectively intercepted by the respective opposite ends of a throughbore therein the longitudinal axis of which is inclined with respect to said surface portions adapter means including a short tubular body portion which is press fit within and to a portion of the axial length of a wall surface of said head portion which bounds said throughbore, in an offset relation to said top surface, said tubular body portion of said adapter means having a flange and a lip integral therewith at the respective ends thereof respectively overlapping and clamped to said bottom surface of said head portion and oppositely facing shoulder means formed in said wall surface which bounds said throughbore, thereby to preclude axial and rotative movement of said adapter means relative said head portion and the inner surface of said tubular body portion having means integral therewith for a quick and secure insertion therein and threaded attachment thereto of one end of a handle to be used for the manipulation of said device during the application thereof to its intended use.

8. Apparatus useful for surface clean up, maintenance and other applications requiring the connection thereto of a handle for the manipulation thereof comprising an operating head formed of wood or other material having like properties mounting means for application thereof to its intended use, said operating head including top and bottom surface portions, leading and trailing edge portions and remote lateral extremities, considering the direction of its movement in use, said head having a laterally centered throughbore opening at one end from the top thereof adjacent its trailing edge and at its opposite end from the bottom thereof, adjacent its leading edge, said throughbore having a counterbore in an upper end portion thereof producing therein an outwardly and rearwardly facing annular shoulder in its bounding wall surface, adapter means, said adapter means including a short tubular body portion securly wedged within said throughbore, towards the bottom of said head, said tublar body portion having an external flange defining a base portion thereof, said flange being in an overlying abutted relation to said bottom surface of said head, an opposite end of said tublar body portion providing an external lip clamped over and to said shoulder to draw said flange into a tightly engaged relation to the bottom surface of said head and a short portion of the length of the inner surface portion of said tubular body portion having means embodied therein enabling an easy and most secure connection thereto of a complementarily formed portion of an applied handle.

9. Apparatus as in claim 8, wherein said operating head has the general form of a rectangular block including remote lateral extremities and said external flange has ends which are arcuately symmetrical and laterally centered with reference to and respecrtively located closely adjacent the leading edge of the bottom surface of said head and more widely spaced from its trailing edge.

10. An adapter for application in a throughbore extending at an acute angel from a top portion to a bottom portion of an operating head of a push broom or other cleaning or applicator device which is formed of wood or other material having like properties and requires the application thereto of a handle for the manipulation thereof, said adapter comprising a short tubular body portion which is press fit from the bottom portion of said operating head within and to a portion of walls which define the throughbore and having means at one end thereof defining an external flange, said flange defining a plane which, relative to a centerline of said tubular body portion, has essentially the smae acute angle as the throughbore with respect to said bottom portion of said operating head, said flange preventing further insertion of said adapter into said throughbore and reinforcing said bottom portion of said operating head, the end of said tubular body portion remote from said flange defining a plane which is perpendicular to the centerline of said tubular portion, the upper end of said tubular body portion configured to act as a seating surface for the handle, the cross section of said tubular body portion immediately of said flange defining an elliptical opening which aligns with and forms part of said bore of said tubular portion embodying means to easily and securely interconnect an end of an applied handle with said tubular body portion on its intersection in said bore thereof, wherein the outer surface of said tubular body portion is distinguished by parallel spaced channels adjacent of which define therebetween bar-like projections a portion of which include blade-like projections from their outer surface and said bar-like projections and blade-like projections are respectively compressed and wedged against and lodged in the portions of said operating head by which they are bounded and define differential connection means which have a pressured interfit with portions of said head precluding their relative axial or rotational displacement therefrom in use of the head to which they apply.

11. Adapter means as in claim 10, wherein said blade-like projections are in the form of tapered pyramidal splines which are relatively inflexible and penetratingly connect with the walls of said throughbore and remain therein to prevent rotational movement of said adapter with respect to said operating head.

12. Adapter means as in claim 11, wherein the inner surface of said tubular body portion embodies within a limited surface portion thereof a very short projected thread the length of which extends no more than about 750° and provides said means to easily and securely interconnect and end of an applied handle with said tubular body portion on its insertion in said bore thereof.

13. Adapter means as in claim 10, wherein said tubular body portion presents a portion of the length of the bore which it defines at the end thereof remote from said means defining its base which has a uniform radius substantially complementary to that of the end of the handle to be applied thereto.

* * * * *